Patented Aug. 22, 1933

1,923,215

UNITED STATES PATENT OFFICE 1,923,215

METHOD OF JOINING LEATHER, ETC.

Otto Peder Krogh, Copenhagen, Denmark

No Drawing. Application October 2, 1929, Serial No. 396,925, and in Germany August 30, 1927

16 Claims. (Cl. 154—40)

This invention relates to a process of joining leather and similar materials and to material to be used for joining such materials. In particular this invention relates to joining of surfaces of fibrous material such as leather and the like and is of particular value in the manufacture of leather articles such as footwear.

One object of this invention is to produce a joint between two fibrous surfaces which has great strength.

Another object of the invention is to produce a joint which is flexible and long wearing under continual flexure.

Another object of the invention is to produce cheaply, in a simple and effective manner, a joint of cold vulcanized rubber material which shall be not injurious to the materials joined.

This application is a continuation, in part of application Serial No. 279,859, in which I have claimed the adhesive or cement shown herein.

In the art of the past there has been extensive use of solutions of unvulcanized rubber in organic solvents and some use of latex and the like, for joining surfaces of fibrous material. This is of limited utility because of the low tensile strength and poorer wearing qualities of unvulcanized rubber. To overcome these disadvantages there has been some use of vulcanizing substances, which were added to the rubber used and after joining the surfaces pressure and usually heat have been used to effect vulcanization. Where leather and the like have been the materials joined it has been greatly injured by the heat treatment and its strength and wearing qualities decreased as the joint strength increased, so that very little was gained.

In some cases accelerators have been added to the rubber, but this made it imperative that the surfaces be joined immediately under pressure, as vulcanization sets in immediately. Furthermore, the joining material had to be freshly made for each operation.

I have overcome the foregoing disadvantages by the following invention, which I shall explain in connection with the joining of two leather pieces, though it is to be understood that one or both of the pieces may be of other matter, such as fibre, fabric, rubber and the like, or other materials, notably those used in making parts of footwear.

The two parts to be joined are first specially treated, the one is grooved down to the core of the material, and the other roughened or buffed, in both cases enabling the latex mixture to penetrate down into the material. A latex-mixture is then applied to each grooved and buffed part of the material, this may be done by brushing or by other methods. This latex-mixture contains vulcanizing agents such as sulphur, zinc oxide and the like. The two coated pieces are then allowed to dry and may be joined as soon as dry or at any period within several months after drying.

As the preferred mode of joining the latex-mixture-coated materials, the two dried latex-mixture-coated parts are then coated (as by brushing, spraying, dipping, etc.) with a solution containing one or more vulcanization accelerators, dissolved in solvents capable of dissolving rubber. The two surfaces are then firmly pressed together and are preferably kept pressed together for some minutes, and are then allowed to stand for a short period while vulcanization of the rubber in the two latex-mixture pieces begins to take place under the action of the accelerators and vulcanizing agent.

A specific example of the liquids used and the manner of operation is as follows. A liquid mixture was made up comprising:

Composition No. I 100 parts of cleaned liquid latex 35–40% rubber content.
0.4 part colloidal zinc oxide.
0.4 part colloidal sulphur and
0.75 of a solution consisting of:
3 parts of casein (fat-free)
0.2 part of sodium sulphide.
0.08 part of sodium salicylate.
14.72 parts of distilled water.

The viscosity of this liquid at 20° C. (Englers method) was 1.5.

Two pieces of leather were then prepared, the one grooved down to the core of the leather by making a number of grooves—by a special constructed grooving machine, which does not form part of this patent application, and the other piece of leather was carefully buffed to remove any glaze or grain, enabling the latex mixture to penetrate down into the leather, and these prepared parts of each were then coated with a liberal coating of the above mixture. The two coated parts were then allowed to dry until they presented a brown appearance. The latex mixture will then be found to have penetrated into the leather to some extent.

A solution was then made up as follows:

Composition No. II 1 part of rubber.
99 parts of trichlorethylene.
1 part of an accelerator (in this particular case a powder made up from)
10 parts of ordinary commercial piperidine.
10 parts of dithiocarbamate.
10 parts of carbon disulphide.
50 parts of China clay.

This material (consisting of the last named four components) has previously been mixed up and dried before adding to the other (i. e. the solution of 1 part rubber in 99 parts of solvent). This material is similar in composition to what is sold on the market under the name "Suparac", and no invention is claimed as to the composition of same.

The two parts to which one or more coats of the latex-mixture had been applied were then covered by brushing on to each Solution No. II (approximately equal amounts in bulk of the solutions were used but sufficient to dissolve the dried latex-mixture-leather-compound.) In five minutes the two surfaces were pressed together and hammered over the entire surface or pressed in a pressing machine until well pressed together.

In one-half hour under tests it was found that the jointure was so strong that on attempts to tear the two pieces apart the leather itself would split and not the joint.

It is understood that the two compositions given may be varied over a considerable range. Preferably the latex used will have to be between 38–40% of rubber but even more concentrated latex may be used. The colloidal zinc and colloidal sulphur may be varied to suit conditions but are preferably maintained between 0.3 and 0.5 parts to 100 parts of purified latex. The solution containing the casein, sodium sulphide, sodium salicylate and distilled water may be varied or changed, or other compositions giving approximately the same effect as to stabilization and preserving etc. may be substituted.

In Solution No. II the rubber is used primarily to regulate the rate of evaporation of the solvent, trichlorethylene, when the same is applied. In other words it acts to make the trichlorethylene evaporate more slowly or it reduces the rate of evaporation of the solvent.

Instead of using rubber to regulate the evaporation all the distillates of coal-tar products with a boiling point between solvent naphtha and enthracene oil can be used as dissolving solution, when rubber is not used, but as the boiling points of the different coal tar products vary very much the use of these requires in each special case analyzing before use, and they are all highly inflammable, so I prefer the use of rubber and a not inflammable solvent.

The vulcanization accelerator used may be present in proportions varying somewhat but preferably it is present as about ½ to 1½% of the second solution. Other accelerators may be substituted for that shown, as is obvious.

Tests were made of the comparative breaking strength of the joint between pairs of pieces of leather joined as disclosed in the above example and similar pairs of pieces of leather joined with rubber cement. One-half hour after joining the split strength of the jointures was tested and gave the following results:

|  | Test No. I | Test No. II | Test No. III |
|---|---|---|---|
| Stuck with rubber cement. | 30 kilos the joint split. | 33 kilos the joint split. | 32 kilos the joint split. |
| Stuck by present invention. | 75 kilos. | 75 kilos. | 75 kilos. |

With the pieces joined by my invention the leather itself split on a plane removed from the plane of the joint, and the test indicated only the strength of the leather itself. With the rubber cement the split was in the joint. Given below are four examples of compositions without rubber, which can be used as No. II in this invention, but I prefer the form given in the prior example as it is more satisfactory from the standpoint of ease of application, safety of use, price etc. and the preferred form of Solution No. II is non-inflammable.

| Naptha solvent | 25%–60% | According to the boiling point of the naptha solvent used. |
|---|---|---|
| Ethyl chloride | 40%–75% | |
| Vulcanizing accelerator | ½%–1½% | |
| Petroleum naptha | 30%–55% | According to the boiling point of the petroleum naphtha used. |
| Ethyl chloride | 45%–70% | |
| Vulcanizing accelerator | ½%–1½% | |
| Shale naptha (olefine and paraffine hydrocarbons equal parts). | | |
| Shale naptha | 25%–60% | According to the boiling point of the shale naptha used. |
| Ethyl chloride | 40%–75% | |
| Vulcanizing accelerator | ½%–1½% | |
| Cymol ($C_{10}H_{14}$) | 60% | |
| Ethyl chloride | 40% | |
| Vulcanizing accelerator | ½%–1½% | |

When Solution No. I is applied to leather which has been prepared by respectively grooving and buffing as described above it penetrates deeply into the leather and makes an intensely firm joint therewith. When No. II is applied to the parts to be joined after the latex-mixture has dried it dissolves the rubber-leather-parts and softens them up so that the two surfaces can be stuck together. The accelerators in the second solution penetrates the dried latex mixture, in the beginning rapidly, as far down as the dried latex mixture is dissolved by the dissolver until they finally reach almost as far down into the rubber-leather-compound formed by the latex-mixture, as the latex mixture itself has done.

The accelerators cause the cold vulcanization of the dried latex mixture-leather-compound and strengthen the joint and even the leather itself as far as the latex mixture has penetrated. When two parts which have been thus treated are joined, they soon merge to form a sequence from one piece of leather to the other which grades gradually from leather to leather-rubber to rubber-leather to leather. After the accelerators have caused the vulcanization to be complete, the rubber is almost entirely vulcanized. Solution No. II does not and cannot act as a cement owing to the minimal contents of rubber, but it merely acts to dissolve the dried latex mixture-leather to which it is applied and to carry the accelerators through, and does this with good effect.

This invention is (as above stated) of particular merit in the manufacture of footwear. The parts to be joined may be coated with composition No. I for a considerable length of time before joining. Preferably they should be coated not less than one half hour before joining and not more than two to four months. The Composition No. II is only applied after the coating of No. I mixture has thoroughly dried, which will normally take not over half an hour. The two parts are then pressed together after not less than 4 minutes nor more than 12 minutes after applying Solution No. II.

It is to be understood that changes in room temperature etc. will influence the rate of evaporation of the solvent and therefore the time interval during which the sticking of the two parts may be done. The rubber contents of Solution No. II may be varied to control the penetration of the accelerator into the dried latex mixture-leather part to the desired extent in the interval required for the solvent to evaporate.

They are then either pressed together by hand or some mechanical means or are hammered over the surface to insure a thorough contact of the parts stuck together. When pressing together by machinery I prefer to subject them to a pressure of 60 pounds per square inch and keep them under this pressure for about 2 minutes.

After this treatment the shoes may continue through the factory in the usual manner and be handled with entire safety. The cold vulcanization of the joint will commence in about half an hour after the surfaces have been pressed together and will continue until complete. The complete vulcanization seems to require about twenty-one to twenty-seven days but the shoe may be worn even as soon as two or three hours after the parts have been stuck together by the present method. Preferably it is not worn until two to six days after joining.

When desired, the No. I composition may contain fibres mixed therewith to strengthen the rubber joint material.

It is to be understood, that although I have described certain modifications in detail I do not wish to be limited thereto except as limited by the following claims.

What I have invented and claim is:

1. A method for joining parts of fibrous material which comprises applying a latex mixture containing vulcanizing agents but free from active vulcanization accelerators, to said parts to be joined, allowing said applied latex mixture to dry, applying to the parts previously treated with latex mixture a solution of an accelerator in a volatile rubber solvent material and thereafter pressing said parts together.

2. A process as in claim 1 wherein rubber is added to said solution containing accelerators to reduce the rate of evaporation of said solvent when said solution is exposed to the atmosphere.

3. A method for joining pieces of leather which comprises grooving the surfaces down to the core of the leather and removing the glaze and grain from the surface of the leather on the pieces which are to be joined, applying a latex mixture to said treated parts, allowing the latex mixture to dry, applying solutions capable of causing the rubber left by said drying latex mixture to vulcanize in a cold state after pressing the pieces to be joined together before the solvent of said second solution has entirely evaporated.

4. A method of uniting pieces, at least one of which is leather, by vulcanization of rubber, comprising applying to the parts to be connected a liquid mixture containing rubber, sulphur, and zinc oxide, drying said parts, applying to said parts a solution in a volatile rubber solvent containing a vulcanization accelerator and pressing said parts together to effect a cold-vulcanization of the rubber left by said first named liquid.

5. A method as in claim 4 wherein the solution containing the accelerator also contains a small amount of dissolved rubber.

6. The method of connecting parts of footwear by vulcanized rubber which consists in applying to the parts to be connected a mixture of rubber latex, sulphur, zinc oxide, and textile fibers, such mixture being free from active accelerators, drying the parts so treated, applying thereto a solution in a rubber solvent containing an accelerator and a small amount of rubber and pressing the parts together, thereby effecting a cold-vulcanization of the rubber left by said applied liquid.

7. The method of connecting parts of footwear by vulcanized rubber consisting in applying to the parts to be connected a mixture of rubber latex, sulphur, and zinc oxide, drying the so treated parts, applying thereto a solution of a vulcanization accelerator in a rubber-solvent, allowing the rubber solvent to soften the rubber and pressing the parts together while the rubber is in a softened state, thereby effecting a joint of vulcanizing rubber.

8. A method of joining parts of fibrous material, which comprises coating the said parts to be joined with a liquid containing a vulcanizable substance and a substance capable of vulcanizing said vulcanizable substance, allowing the vehicle to evaporate from the applied liquid, wetting the surfaces to be joined with the second liquid, which is a solution of an accelerating agent in a rubber solvent, and pressing said surfaces together.

9. An article comprising at least two portions of fibrous material, said portions being joined by a bond of vulcanized rubber, which vulcanization has been effected in a cold state by an accelerator, which has been carried into the rubber by a volatile rubber solvent.

10. A method for joining surfaces which comprises coating the surfaces to be joined with a liquid containing a vulcanizable substance and a substance which would, in the presence of a vulcanization accelerator, be capable of uniting with said vulcanizable substance to produce a vulcanized substance, allowing the surfaces thus coated to dry, wetting the surfaces with a second liquid which is a solution capable of accelerating the process of vulcanization and joining the surfaces.

11. A method as in claim 10 wherein the second liquid is a solution comprising a volatile medium, a vulcanizable gum and a vulcanization accelerator.

12. A product comprising a piece of leather which has been at least partially coated with a vulcanizable substance and a vulcanizing agent, and a second liquid applied thereto containing a vulcanizable substance and a vulcanization accelerator.

13. An article comprising at least two portions of leather, one of which is impregnated with vulcanized rubber to its core, said pieces being joined by a layer of vulcanized rubber, which vulcanized rubber has the properties of a film of rubber latex and sulphur which has been penetrated by a liquid containing rubber solvent and a vulcanization accelerator.

14. Method of uniting pieces, at least one of which is leather, by vulcanized rubber, consisting in applying to the parts to be connected a liquid mixture containing unvulcanized rubber and sulphur, such mixture being free from accelerators capable of causing such unvulcanized rubber and sulphur to combine with each other, drying the films thus formed, applying to the said films a rubber solution containing an accelerator, and pressing the parts together thereby effecting a cold vulcanization of the entire rubber layer.

15. Method of connecting parts of footwear by vulcanized rubber consisting in applying to the parts to be connected a mixture of rubber latex, sulphur, and fibres, such mixture being free from accelerators capable of causing such unvulcanized rubber and sulphur to combine with each other, drying the parts so treated, applying thereto a rubber solution containing an accelerator, and pressing the parts together thereby effecting a cold vulcanizing of the entire rubber layer.

16. Method of connecting parts of footwear by vulcanized rubber, consisting in applying to the parts to be connected a mixture of rubber latex and sulphur, drying the so treated parts, applying thereto a solution in a rubber solvent containing an accelerator, so as to soften the rubber, and pressing the parts together while the rubber is in a softened state, thereby effecting a cold vulcanization of the entire rubber layer.

OTTO PEDER KROGH.